(12) United States Patent
Böhm

(10) Patent No.: US 7,640,791 B2
(45) Date of Patent: Jan. 5, 2010

(54) LEAK DETECTING DEVICE

(75) Inventor: Thomas Böhm, Köln (DE)

(73) Assignee: Inficon GmbH (DE)

( * ) Notice: Subject to any disclaimer, the term of this patent is extended or adjusted under 35 U.S.C. 154(b) by 249 days.

(21) Appl. No.: 11/792,609

(22) PCT Filed: Nov. 15, 2005

(86) PCT No.: PCT/EP2005/055992

§ 371 (c)(1),
(2), (4) Date: Jun. 7, 2007

(87) PCT Pub. No.: WO2006/061311

PCT Pub. Date: Jun. 15, 2006

(65) Prior Publication Data

US 2008/0184782 A1 Aug. 7, 2008

(30) Foreign Application Priority Data

Dec. 10, 2004 (DE) .................. 10 2004 059 485

(51) Int. Cl.
*G01M 3/04* (2006.01)
(52) U.S. Cl. ...................................... 73/40.7
(58) Field of Classification Search .................. 73/40.7
See application file for complete search history.

(56) References Cited

U.S. PATENT DOCUMENTS

| | | | |
|---|---|---|---|
| 2,947,166 A * | 8/1960 | Palmer et al. ................. 73/40.7 |
| 4,583,394 A * | 4/1986 | Murakami et al. ............ 73/40.7 |
| 4,648,260 A * | 3/1987 | Zuckerman ................. 73/23.36 |
| 4,665,385 A * | 5/1987 | Henderson ............. 340/539.26 |
| 5,277,057 A * | 1/1994 | Takashima et al. ......... 73/31.01 |
| 5,394,094 A * | 2/1995 | Wagner ....................... 324/556 |
| 5,527,446 A * | 6/1996 | Kosek et al. ............. 205/792.5 |
| 5,889,199 A * | 3/1999 | Wong et al. ..................... 73/40 |
| 5,907,092 A * | 5/1999 | Bohm ........................ 73/40.7 |
| 6,635,875 B1 * | 10/2003 | Bley et al. .................. 250/345 |
| 2004/0194533 A1 | 10/2004 | Bohm et al. |
| 2005/0162659 A1 | 7/2005 | Freeman et al. |

FOREIGN PATENT DOCUMENTS

GB 1489953 10/1977

OTHER PUBLICATIONS

INFICON Catalog 2000-2001, "PROTEC helium sniffer", 2000-2001, pp. B5.22-B5.23.*
International Search Report for PCT/EP2005/055992 dated Mar. 13, 2006 (2 pages).

* cited by examiner

*Primary Examiner*—Daniel S Larkin
(74) *Attorney, Agent, or Firm*—Marjama Muldoon Blasiak & Sullivan

(57) ABSTRACT

A leak detecting device includes a carrying device attached to a holder to be fastened to the body of an operator. From the carrying device, a flexible capillary line extends to a sniffing probe, which includes a gas inlet at its front end. The carrying device is connected with a basic device that includes a vacuum pump. In the carrying device, a test gas detector is arranged.

3 Claims, 1 Drawing Sheet

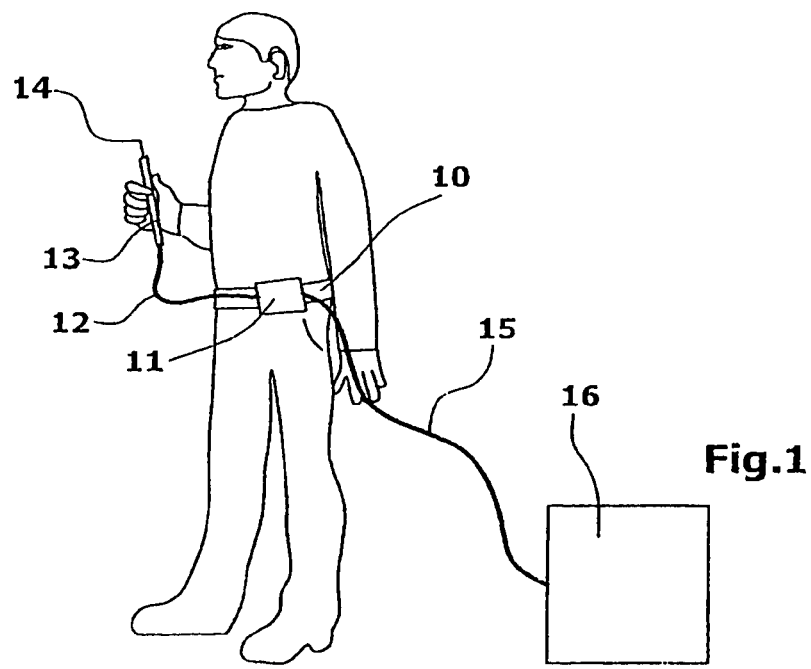
Fig.1
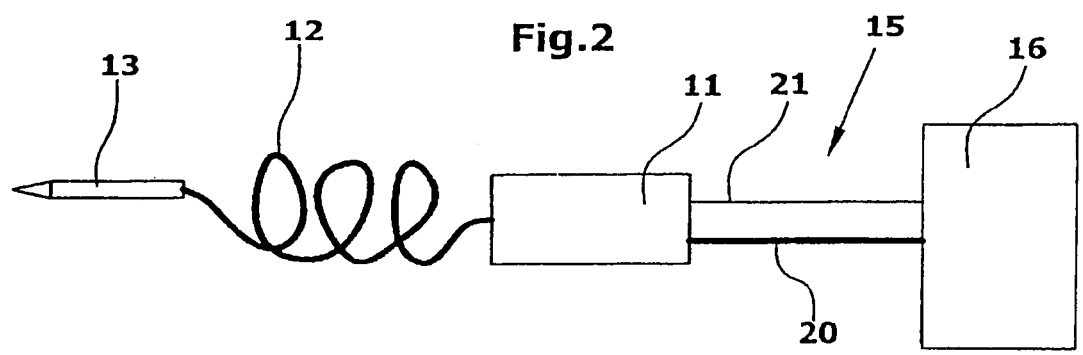
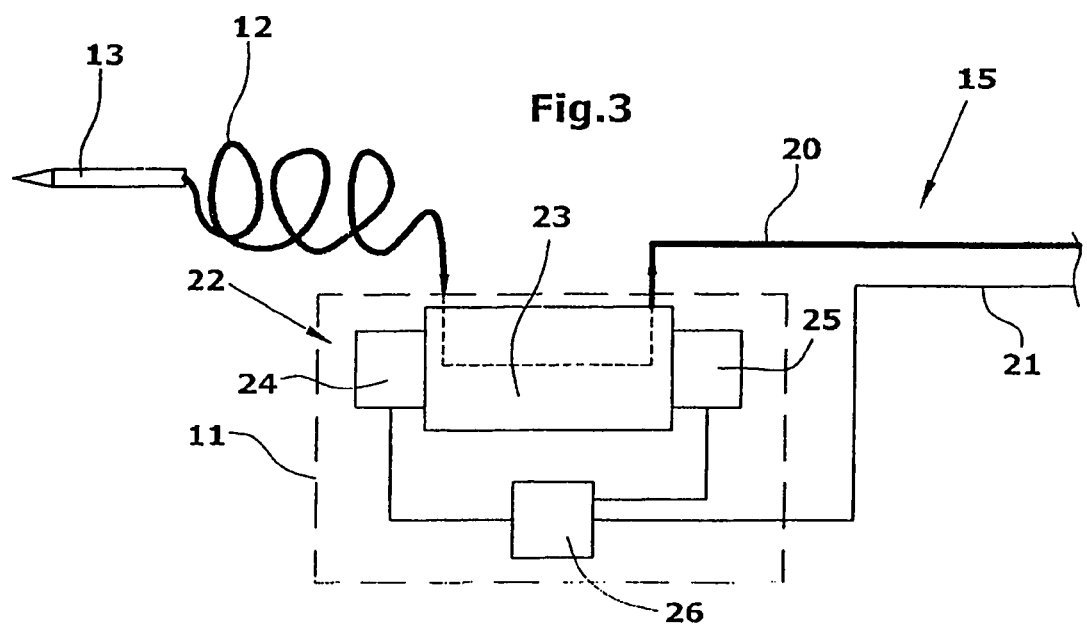

LEAK DETECTING DEVICE

FIELD OF THE INVENTION

The invention relates to a leak detecting device comprising a sniffing probe and a test gas sensor.

BACKGROUND OF THE INVENTION

Leak detecting devices serve for detecting leaks in test objects containing a test gas, such as helium. Leak detecting devices are known which comprise a hand-held sniffing tip. Gas is taken in through the sniffing probe and fed to a test gas sensor. The devices require a vacuum pump which is normally accommodated in a floor- or table-mounted device, i.e. a basic device placed on the floor or on a table. The basic device frequently also includes the test gas detector. Said test gas detector may be a mass spectrometer or a structurally smaller infrared gas analyzer.

Normally, the sniffing probe is connected with the basic device via a capillary line. The operator can relatively easily move the sniffing probe in the vicinity of the test object in search of possible leaks. However, such leak detecting devices have a longer response time. The response time is the period between the intake of the leakage gas and the indication. The response time is determined by the length of the sniffing line which is typically 5 meters. Added to this is the response time of the test gas detector.

WO 03/008923 A2 describes a sniffing-type leak detector where the test gas detector is integrated in a handpiece to which the sniffing probe is attached. The handpiece may be connected with the floor- or table-mounted basic device via a line, wherein the basic device comprises, inter alia, a vacuum pump and an indicator means. Said leak detecting device has a short response time due to the short distance between the intake opening of the sniffing probe on the one hand and the test gas detector on the other hand. However, the handpiece with the sensors arranged therein is large and heavy such that the use of the leak detecting device in continuous operation is fatiguing to the operator. Further, constricted regions of the test objects are difficult to access by the voluminous handpiece.

SUMMARY OF THE INVENTION

It is an object of the invention to provide a leak detecting device comprising a hand-held sniffing probe, which leak detecting device, on the one hand, has a relatively short response time and, on the other hand, is adapted to be operated without causing fatigue.

The leak detecting device according to the invention comprises a test gas detector fixed to a holder which is adapted to be carried on the body of an operator, and the sniffing probe which is movably connected with the sniffing tip via a flexible capillary line. The sniffing tip may be of very small and light-weight configuration such that it can be easily held by the operator and guided to the desired places. Moving the sniffing tip does not cause fatigue even if the device is operated over longer period. From the sniffing tip the relatively short capillary line having a length of approximately 1 meter extends to a carrying device fastened to the body of the operator. The holder required for this purpose is a belt, for example, to which the carrying device can be attached without impeding the free movement of the operator. Although the required capillary line slightly increases the response time, its length is so small that this is negligible.

The vacuum pump required for taking in the gas may be accommodated in a basic device configured as a floor- or table-mounted device. The basic device is connected with the carrying device via a flexible line which comprises both a capillary line and electrical lines. The length of said line does not increase the response time. Alternatively, it is possible to integrate a vacuum pump into the carrying device. This however increases the volume and the weight of the carrying device.

The sniffing probe may be a pin with a maximum length of 15 cm and a maximum diameter of 15 mm. The pin may be provided with a projecting handle and thus be configured as a gun. A switch for manually starting the testing operation may also be provided at the sniffing probe.

In particular an infrared gas analyzer is a suitable test gas sensor designed for being carried in the carrying device fastened to the body.

BRIEF DESCRIPTION OF THE DRAWINGS

An embodiment of the invention will now be described in greater detail with reference to the drawings in which:

FIG. 1 shows a representation of an operator searching for a leak using the leak detecting device according to the invention, FIG. 2 shows a schematic representation of the leak detecting device, and FIG. 3 shows the test gas detector included in the carrying device.

DETAILED DESCRIPTION

As shown in FIG. 1, an operator carries a carrying device 11 in a holder 10. The holder 10 is a simple belt in which the carrying device 11 is suspended. From the carrying device 11, a capillary line 12 extends to a sniffing probe 13. The sniffing probe 13 is configured as an elongate pin having the dimensions of a ball pen, for example. At its tip, a suction inlet 14 is provided through which gas is taken in. The capillary line 12 is of flexible configuration such that the sniffing probe 13 can be unimpededly moved.

From the carrying device 11, a flexible line 15 extends to a basic device 16 configured as a floor- or table-mounted device, which comprises a vacuum pump, as well as control units and an indicator means, as well as alarm means, if necessary. The flexible line 15 includes, inter alia, a capillary line, power supply lines and signal lines.

FIG. 2 shows the sniffing probe 13 which is connected with the carrying device 11 via a flexible capillary line 12. The flexible line 15 connecting the carrying device 11 with the basic device 16 includes a capillary line 20, as well as electrical lines 21.

The carrying device 11 includes the test gas detector 22 shown in FIG. 3. The test gas detector is an infrared gas analyzer comprising a cuvette 23 through which the gas taken in flows in longitudinal direction. The gas inlet of the cuvette is connected with the capillary line 12, and the gas outlet is connected with the capillary line 20. At the front end of the cuvette 23 an infrared light source 24 is located, and at the other end an infrared detector 25 is arranged. The signals of the infrared detector 25 are evaluated by a microprocessor 26 and transmitted to the basic device 16.

Generally, the sniffing probe 13 draws ambient air into the carrying device 11. If the test object containing a test gas has a leak, the test gas escapes into the ambient air. The test gas detector 22 selectively responds to the presence of test gas such that the presence of a leak is detected.

The invention claimed is:

1. A leak detecting device comprising a sniffing probe and a test gas detector, wherein the test gas detector is accommodated in a carrying device fastened to a holder to be carried on the body of an operator, and connected with the sniffing probe via a first flexible capillary line, and wherein a basic device containing a vacuum pump is connected with the carrying device via a second flexible capillary line.

2. The leak detecting device according to claim 1, wherein the sniffing probe is a pin having a maximum length of about 15 cm and a maximum diameter of about 15 mm.

3. The leak detecting device according to claim 1, wherein the test gas detector is an infrared gas analyzer.

* * * * *